United States Patent
Doehring

(10) Patent No.: US 10,738,823 B2
(45) Date of Patent: Aug. 11, 2020

(54) TILTING-PAD BEARING

(71) Applicant: Robert Bosch GmbH, Stuttgart (DE)

(72) Inventor: Jochen Doehring, Stuttgart-Stammheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/329,081

(22) PCT Filed: Aug. 10, 2017

(86) PCT No.: PCT/EP2017/070265
§ 371 (c)(1),
(2) Date: Feb. 27, 2019

(87) PCT Pub. No.: WO2018/041579
PCT Pub. Date: Mar. 8, 2018

(65) Prior Publication Data
US 2019/0219097 A1    Jul. 18, 2019

(30) Foreign Application Priority Data

Aug. 31, 2016   (DE) .......................... 10 2016 216 396

(51) Int. Cl.
*F16C 17/03*       (2006.01)
*F16C 25/02*       (2006.01)
(Continued)

(52) U.S. Cl.
CPC ............ *F16C 17/03* (2013.01); *F01D 25/166* (2013.01); *F16C 23/02* (2013.01); *F16C 25/02* (2013.01);
(Continued)

(58) Field of Classification Search
CPC ........ F16C 17/028; F16C 17/03; F16C 23/02; F16C 25/02; F16C 27/02; F16C 2360/24;
(Continued)

(56) References Cited

U.S. PATENT DOCUMENTS 1,595,744 A    8/1926  Trumpler
3,215,480 A *  11/1965 Marley ................. F16C 17/024
                                                        384/104
(Continued)

FOREIGN PATENT DOCUMENTS

CN         1216509 A      5/1999
CN         102562783 A    7/2012
(Continued)

OTHER PUBLICATIONS

International Search Report for Application No. PCT/EP2017/0070265 dated Nov. 24, 2017 (English Translation, 3 pages).

*Primary Examiner* — Marcus Charles
(74) *Attorney, Agent, or Firm* — Michael Best & Friedrich LLP

(57) ABSTRACT

A tilting-pad bearing (1) includes a sleeve (5), a plurality of tilting pads (4), which are arranged in the sleeve (5), wherein an associated spring element (3) is provided between the sleeve (5) and each tilting pad (4), wherein the spring element (3) has at least two sections having a stiffness of different magnitude as a result of varying the thickness of the cross-section (8, 10) of the spring element (3) in the width direction and/or longitudinal direction of the spring element (3).

22 Claims, 5 Drawing Sheets

(51) Int. Cl.
  *F16C 23/02* (2006.01)
  *F01D 25/16* (2006.01)
  *F16F 1/02* (2006.01)
  *F16F 1/36* (2006.01)
  *F16F 1/373* (2006.01)
  *F16C 27/02* (2006.01)

(52) U.S. Cl.
  CPC ............ *F16F 1/027* (2013.01); *F16F 1/3615* (2013.01); *F16F 1/3737* (2013.01); *F16C 27/02* (2013.01); *F16C 2360/24* (2013.01)

(58) Field of Classification Search
  CPC .......... F16F 39/02; F16F 1/027; F16F 1/3615; F16F 1/3737; F16F 15/0275; F16F 1/02; F01D 25/166
  USPC .......... 384/99, 104, 106, 117, 119, 306, 312
  See application file for complete search history.

(56) References Cited

U.S. PATENT DOCUMENTS

| | | | | |
|---|---|---|---|---|
| 3,238,072 A * | 3/1966 | Greene | .................. | B23P 15/00 148/580 |
| 3,434,762 A * | 3/1969 | Marley | .................. | F16C 17/10 384/103 |
| 3,565,498 A * | 2/1971 | Leopard et al. | ...... | F16C 17/065 384/303 |
| 3,711,169 A * | 1/1973 | Gardner | .................. | F16C 17/03 384/309 |
| 3,900,357 A * | 8/1975 | Huchette | ............... | B29C 70/345 156/185 |
| 3,945,625 A * | 3/1976 | Duchemin | ............. | F16F 1/185 267/47 |
| 3,951,475 A * | 4/1976 | Okano | .................... | F16C 17/03 384/117 |
| 4,099,799 A | 7/1978 | Etsion | | |
| 4,118,079 A * | 10/1978 | Newman | .................. | F16C 17/03 384/100 |
| 4,526,483 A * | 7/1985 | Hishikawa | ............. | F16C 17/024 384/106 |
| 4,767,222 A * | 8/1988 | Paletta | .................. | F16C 17/024 384/106 |
| 4,927,275 A | 5/1990 | Lawson | | |
| 5,032,028 A * | 7/1991 | Riazuelo | ............... | F16C 17/024 384/103 |
| 5,205,652 A * | 4/1993 | Chapman | ............. | F01D 25/164 384/106 |
| 5,266,066 A * | 11/1993 | White | ....................... | F16H 7/08 474/111 |
| 5,271,509 A * | 12/1993 | Ross | ...................... | B64G 1/641 211/13.1 |
| 7,066,651 B2 * | 6/2006 | Nicholas | .................. | F16C 27/02 384/99 |
| 8,083,413 B2 * | 12/2011 | Ertas | ...................... | F16C 17/035 384/117 |
| 8,308,364 B2 * | 11/2012 | Tecza | .................... | F16C 32/0442 384/99 |
| 9,429,191 B2 * | 8/2016 | Ertas | ...................... | F01D 25/164 |
| 2002/0054718 A1 | 5/2002 | Weissert | | |
| 2002/0106138 A1 * | 8/2002 | Akizuki | ................ | F16C 17/024 384/106 |
| 2015/0139573 A1 * | 5/2015 | Klusacek | ............... | F04D 29/057 384/114 |
| 2016/0123391 A1 * | 5/2016 | Minegishi | ............. | F04D 29/046 |

FOREIGN PATENT DOCUMENTS

| | | | | |
|---|---|---|---|---|
| DE | 1575519 | | 3/1972 | |
| DE | 102010049493 | | 5/2012 | |
| DE | 102013223329 | A1 | 5/2015 | |
| EP | 0106249 | | 4/1984 | |
| EP | 0225485 | | 6/1987 | |
| EP | 2492074 | | 8/2012 | |
| GB | 2172668 | | 9/1986 | |
| JP | 60196425 | A * | 10/1985 | .............. F16C 17/03 |
| JP | 06307434 | | 11/1994 | |
| JP | 0727132 | | 1/1995 | |
| JP | 07151139 | | 6/1995 | |
| JP | 08312641 | | 11/1996 | |
| SU | 709858 | | 1/1980 | |
| WO | 2008102921 | A1 | 8/2008 | |

* cited by examiner

TILTING-PAD BEARING

BACKGROUND OF THE INVENTION

The invention relates to a tilting-pad bearing for the mounting of a shaft.

Tilting-pad bearings are known in the art of air bearings.

From DE 10 2010 049 493 A1 there is known an annular supporting part which has an opening in which bearing elements are arranged. The bearing elements are configured as tilting pads. A holding element is arranged in the opening of the supporting part, having a mushroom-shaped configuration, so that one or more lugs are arranged in the area of the holding element, forming undercuts. These undercuts interact with an opening produced in the bearing element, which is likewise configured in a manner corresponding to the undercuts of the holding element so that in the mounted state the undercuts are engaged with a spacing by suitable parts of the bearing element. The bearing element is latched when it is inserted into the opening of the supporting part and thus it can be secured against falling out.

SUMMARY OF THE INVENTION

The invention discloses a tilting-pad bearing.

Accordingly, a tilting-pad bearing is proposed, comprising:
a sleeve,
a plurality of tilting pads, which are arranged in the sleeve, wherein an associated spring element is provided between the sleeve and the respective tilting pad, wherein the spring element has at least two sections with a stiffness of different magnitude as a result of varying the thickness of the cross section of the spring element in the width direction and/or longitudinal direction of the spring element.

Owing to the configuring of the spring element with at least two sections having different stiffness, the stiffness of the spring element can be specifically adapted. Thus, for example, the spring element can be stiffer in the middle owing to a greater thickness than at its sides, so that the spring element can absorb greater forces by an associated tilting pad upon running up of a shaft mounted in the tilting-pad bearing without the shaft shifting undesirably to one side in the radial direction, or shifting too much. In particular, the position of the shaft can be dictated at the center of the sleeve by means of the spring element and its at least two sections of different thickness and the associated tilting pad. The integrated spring element serves as a positioning aid, including the spring function under increased forces.

In one embodiment of the invention, the thickness of the cross section of the spring element increases in the width direction and/or longitudinal direction of the spring element starting from one end point of the cross section, especially toward the center of the cross section, and then decreases once more toward the opposite end point of the cross section, especially from the center of the cross section. In this way, the stiffness of the spring element increases toward the center. The stiffness at the center or a central region of the spring element may be adapted to the speed range of a shaft being mounted in the tilting-pad bearing so that the shaft cannot move radially outward, or only does so in a predetermined range in which no unwanted rubbing of a running wheel connected to the shaft against an associated housing will occur, for example.

The thickness of the cross section of the spring element in one embodiment of the invention may be constant in the width direction or longitudinal direction of the spring element from one end point of the cross section to the opposite end point of the cross section. Thus, the thickness of the cross section may increase either continuously or also discontinuously and in the case of a discontinuous increasing of the thickness it may also have at least one section with a constant thickness or thickness profile. This produces further possibilities for specifically adjusting the stiffness in the longitudinal and width direction and the stiffness profile of the spring element in the longitudinal and width direction.

The thickness of the cross section in one embodiment of the invention increases continuously or increases discontinuously in at least one portion of the cross section of the spring element in the width direction and/or longitudinal direction and/or the thickness of the cross section of the spring element decreases continuously or decreases discontinuously in at least one portion of the cross section in the width direction or longitudinal direction. Owing to portions of the spring element where the cross sectional thickness decreases, the spring element can become softer in these portions or the stiffness of the spring element can be specifically reduced, depending on the function and the usage purpose.

The stiffness of the spring element in a further embodiment of the invention increases and/or decreases starting from its end edges, e.g., lengthwise end edges, toward the center. Accordingly, the stiffness of the spring element can increase and/or decrease continuously or discontinuously and be specifically adapted to the corresponding function and corresponding usage purpose.

In another embodiment of the invention, the cross section of the spring element may be symmetrical in the width direction and/or longitudinal direction and in particular have at least one axis of symmetry. Such spring elements are especially easy to produce owing to the symmetrical configuration. Likewise, the cross section of the spring element may also not be symmetrically designed in the width direction and/or longitudinal direction, depending on the function and the usage purpose.

The spring element has, in relation to the sleeve, an outer side which is opposite to the sleeve and an inner side which is opposite to the tilting pad, wherein according to one embodiment of the invention the outer side and/or the inner side of the spring element is outwardly curved or concave.

In another embodiment of the invention, the outer side or inner side of the spring element is planar. Such a planar configuration of one side of the spring element has the advantage that manufacturing costs can be reduced.

The outer side and/or the inner side of the spring element in another embodiment of the invention is inwardly curved or convex. This is advantageous in regard to production and installation, depending on where the tilting pads are installed.

In one embodiment of the invention, the spring element has a progressive or degressive spring characteristic. In this way, the application range of the spring element can be further expanded.

According to one embodiment of the invention, a gap between the inner side of the sleeve and the outer side of the respective spring element can be adjusted by an associated adjustment device, which is coupled to the spring element. The spring element may be provided with a corresponding opening for coupling the spring element to the adjustment device, for example by stringing it on or snapping it on.

In another embodiment of the invention, at least one of the tilting pads of the tilting-pad bearing is formed from graphite or another suitable material having the lowest possible friction during operation. Likewise, the tilting pad may be provided with a coating of a suitable material having the lowest possible friction during operation.

The spring elements of the tilting-pad bearing in embodiments of the invention are made for example of metal, plastic and/or a fiber composite. A spring element made of metal can be formed for example as a metal spring element fully milled from this.

BRIEF DESCRIPTION OF THE DRAWINGS

Further features and advantages of the present invention shall be explained below with the aid of the figures. There are shown.

DETAILED DESCRIPTION

Figure 1:
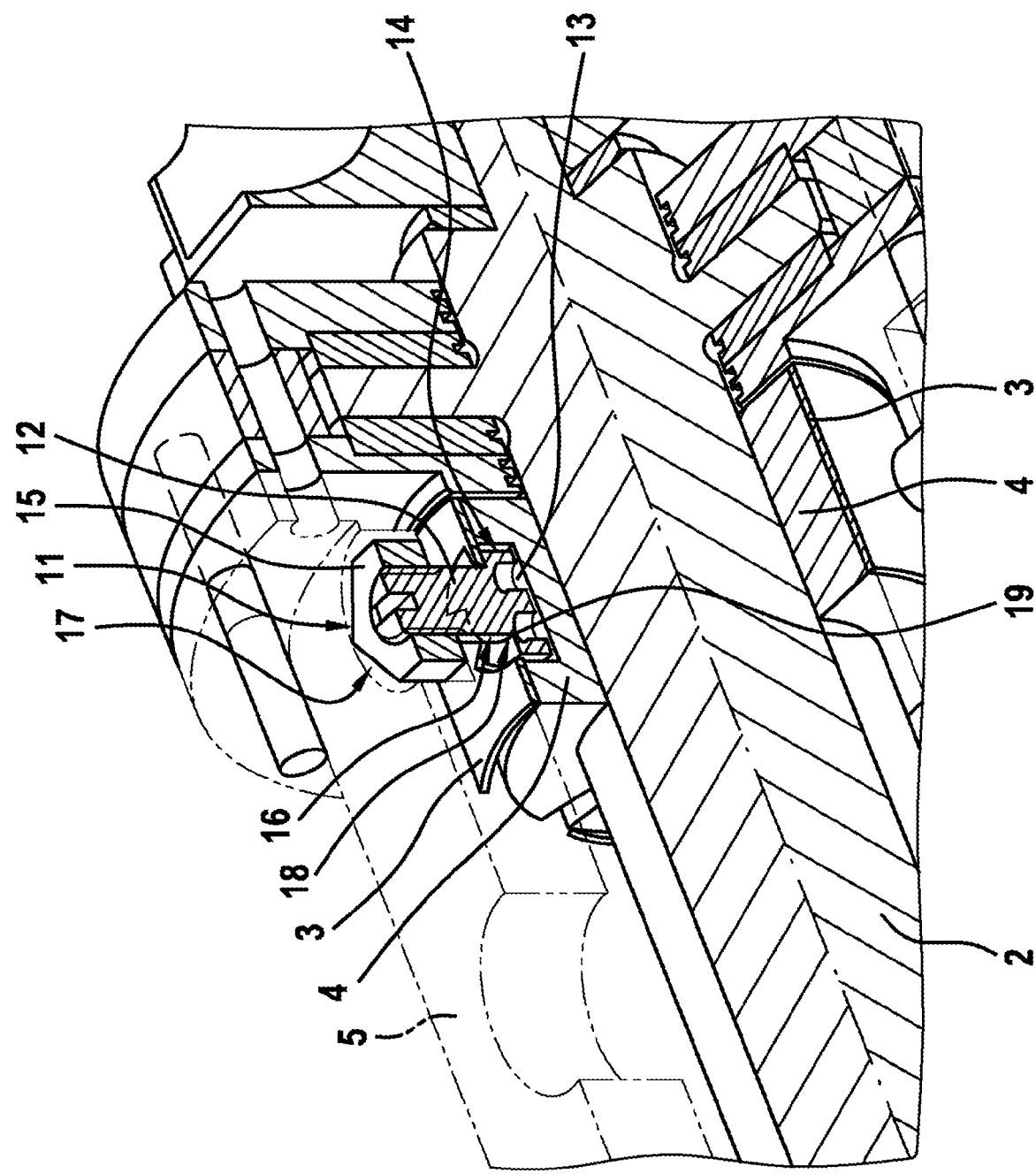
FIG. 1, a partly transparent and partly sectional perspective view of one embodiment of a tilting-pad bearing according to the invention for the mounting of a shaft.
Figure 2:
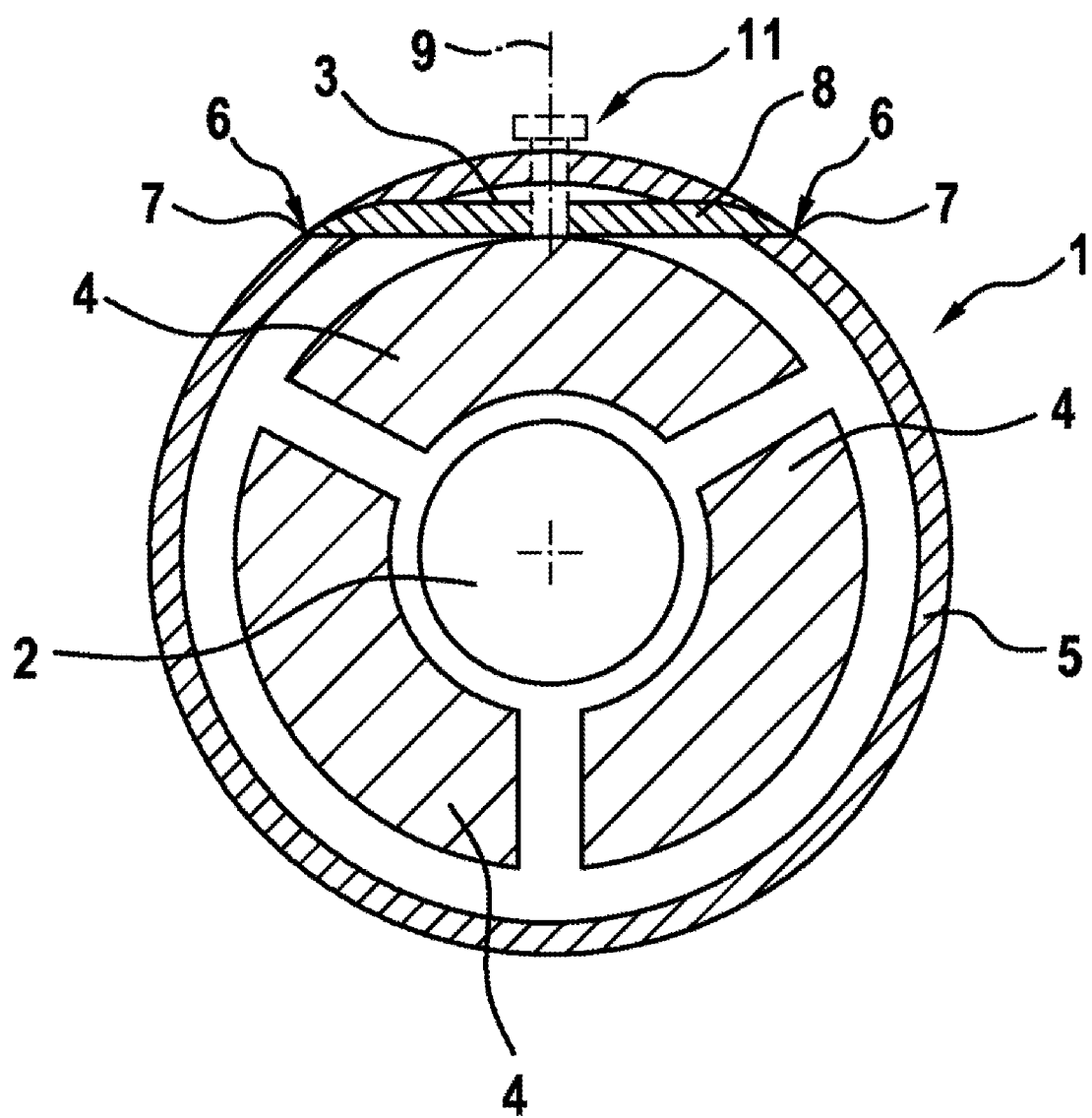
FIG. 2, a schematic and highly simplified sectional view of the tilting-pad bearing according to the invention per FIG. 1, showing one spring element in a starting position before being installed in the tilting-pad bearing.
Figure 3:
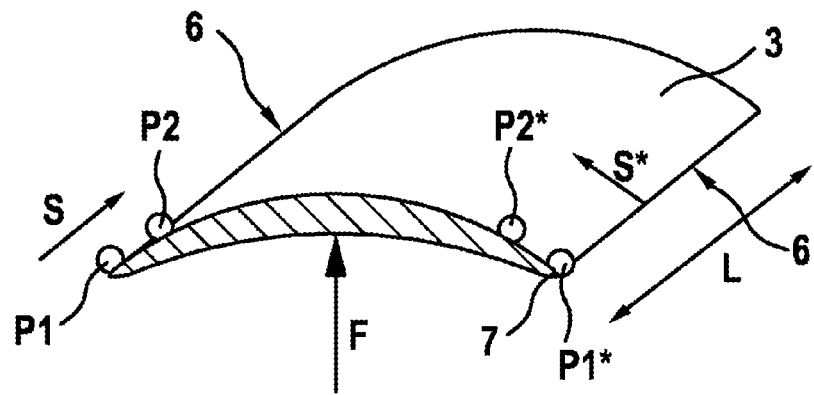
FIG. 3, a highly simplified view of the spring element per FIG. 2, showing the spring element in an installed position.

FIG. 1 is a partly transparent and partly sectional perspective view of one embodiment of a tilting-pad bearing 1 according to the invention for the mounting of a shaft 2. FIG. 2 further shows a schematic and highly simplified sectional view of the tilting-pad bearing 1 according to the invention per FIG. 1, showing one spring element 3 in a starting position before being installed in the tilting-pad bearing 1. FIG. 3 shows the spring element 3 of FIG. 2 once again in its installed position in the tilting-pad bearing, but without the further components of the tilting-pad bearing for reasons of clarity. Moreover, FIG. 4 likewise shows a schematic and highly simplified sectional view of the tilting-pad bearing 1 according to the invention per FIG. 1, the spring element 3 associated with the respective tilting pad 4 being represented in the installed position, as previously in FIGS. 2 and 3.

Due to fabrication tolerances, thus far graphite tilting pads have been back-sprung. Traditional leaf springs are used for this, being made from a metal sheet and having a constant thickness throughout. Thus, for example in turbochargers, it may happen that the gap is correspondingly large between the housing and the turbine or compressor wheel, which are secured on a common shaft, so that the efficiency of the turbocharger remains low. On the other hand, if the spacing is too little, there may occur an unwanted rubbing of the turbine or compressor wheel against the housing of the turbocharger, which in turn may lead to a subsequent total failure of the turbocharger.

According to the invention, therefore, a tilting-pad bearing 1 is provided in which the respective spring element 3 for the back-springing of an associated spring element 4 of the tilting-pad bearing 1 has at least two sections with a stiffness of different magnitude. For this, the thickness of the spring element, more precisely the thickness of the cross section of the spring element in the width direction and/or longitudinal direction of the spring element, varies so that the spring element has at least two portions with a stiffness of different magnitude. In this way, the spring characteristic of the spring element can be adapted specifically to the tilting-pad bearing 1 and the tilting pad 4 being back-sprung by the spring element 3 and it may have for example a progressive or degressive characteristic curve, depending on the function and purpose of use, as shall be explained in detail hereafter with the aid of FIGS. 1 to 4 and the following FIGS. 5 to 9.

In this way, with the tilting-pad bearing 1 according to the invention, the manufacturing costs can be reduced for the tilting-pad bearing 1, since manufacturing tolerances can be corrected by an adjustable spring characteristic of the respective spring element 3 of the tilting-pad bearing 1. In this way, the shaft 2 mounted by the tilting-pad bearing 1 can be better positioned especially in the radial direction and for example in the case of a turbocharger, an unwanted rubbing of its compressor or turbine wheel against the associated housing can be prevented. Another advantage of the tilting-pad bearing 1 according to the invention is the flexible adapting of the geometry of the gap between shaft 2 and respective tilting pad 4, by which the carrying behavior of the tilting-pad bearing 1 can be specifically influenced. Furthermore, the combined sprung and guided tilting pads 4 can be used primarily during the installation and orienting of the shaft 2, but also for the increasing of stiffness and/or dampening during operation. Moreover, other tilting pad materials can be used besides graphite, having for example good emergency running properties, i.e., little or no friction. The tilting pads can be provided with a coating, e.g., at the front on the tilting pad, composed of a lubricating varnish, a carbon ("C") layer, and so on. In addition or alternatively, the tilting pads may be provided with a micro-structure on the outer side, e.g., a fish scale structure. The respective spring element 3, as well as further exemplary embodiments of a spring element in the following FIG. 5-8, can be made for example of metal, plastic, and/or fiber composite and so on. The spring elements of metal can be made by punching, milling, sintering, pressing, a suitable joining method, and so on.

The tilting-pad bearing 1 according to the invention per FIGS. 1 to 4 comprises a sleeve 5, in which a plurality of tilting pads 4, such as three tilting pads 4 made of graphite or a graphite material, are arranged. The respective spring element 3 is arranged between the inner side of the sleeve 5 and the outer side of the respective tilting pad 4. The thickness of the spring element 3 is not constant throughout along its total length and width but instead varies at least along its length or width. As shown in particular in FIGS. 2, 3 and 4, the thickness of the cross section 8 of the spring element 3 increases for example in the width direction B, starting from its first end point 6 at the end edge 7 of the spring element 3 toward the center or toward the center of the spring element 3 and from there it decreases once more toward the opposite end point 6 at the other end edge 7 of the spring element 3, so that the cross section of the spring element 3 is thicker and thus stiffer at the center than in the area of its end points 6. As shown in FIG. 2, the cross section of the spring element 3 in the width direction B is for example in mirror symmetry to its center axis 9. The thickness of the cross section 10 of the spring element 3 in the longitudinal direction L, on the other hand, is constant for example, as shown in FIG. 3.

The spring element 3 in the exemplary embodiment in FIGS. 1 to 4 has, e.g., an outwardly or convex curved outer side and a planar or flat inner side. The reverse case is likewise possible. The outer side of the spring element 3 is the side by which the spring element 3 in its installed position in the tilting-pad bearing 1 faces the inner side of the sleeve 5. The inner side of the spring element 3, in turn, is the side by which the spring element 3 in its installed position in the tilting-pad bearing 1 faces the outer side of the shaft 2 mounted in the tilting-pad bearing 1. This applies for all embodiments of the invention.

The outer side and inner side of the spring element 3 may likewise be outwardly curved or convex, as in the following FIGS. 5 and 8. Basically, one of the sides can also be outwardly curved or convex and the other side inwardly curved or concave, as shown in the following FIG. 6.

Figure 5:
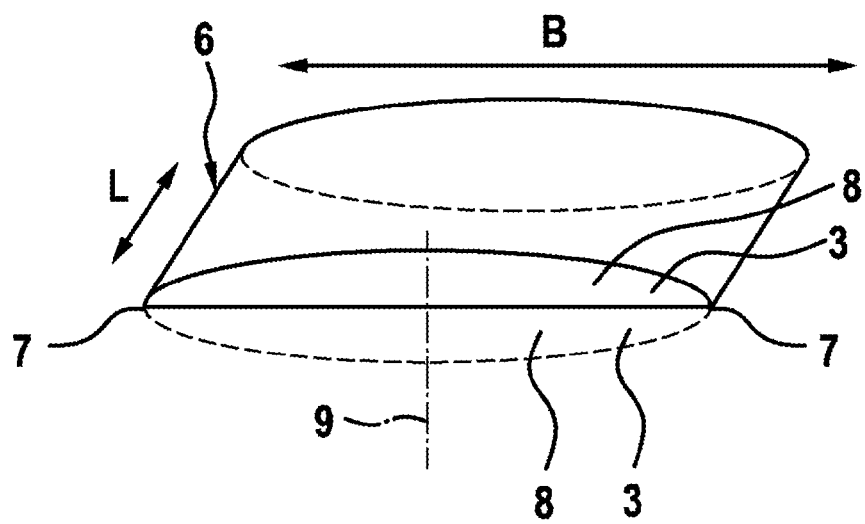
FIG. 5, a schematic and highly simplified sectional view of another embodiment of a spring element of the tilting-pad bearing according to the invention.
Figure 6:
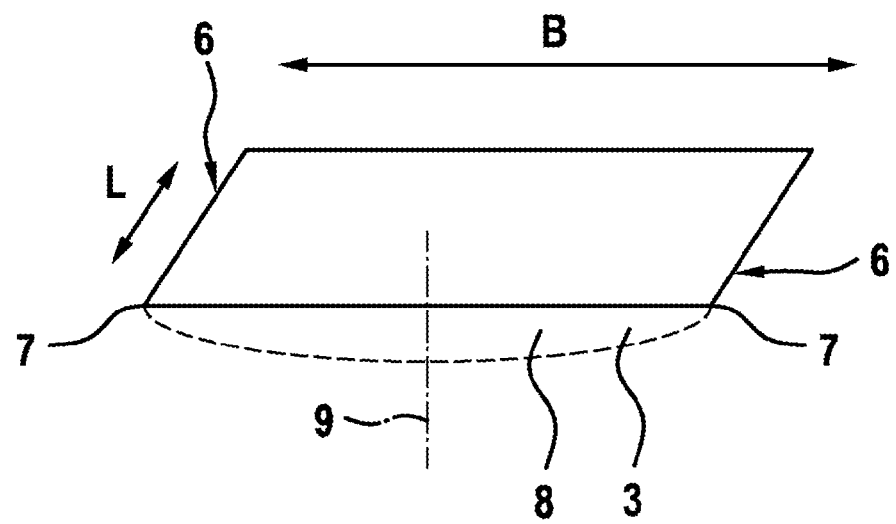
FIG. 6, a schematic and highly simplified sectional view of another embodiment of a spring element of the tilting-pad bearing according to the invention.

Further variants for the configuring of the spring element 3 per FIGS. 5 and 6 are shown in the following FIG. 7, 8.

Figure 4:
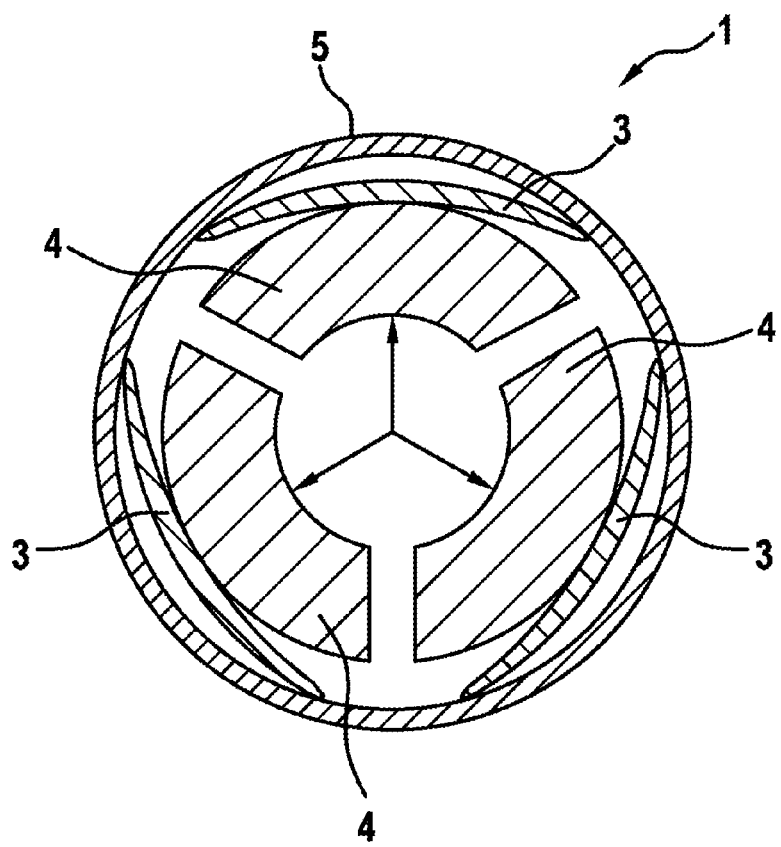
FIG. 4, the tilting-pad bearing per FIG. 2, showing all spring elements and represented in the installed position in the tilting-pad bearing.

In order to adjust the pretensioning of the respective spring element 3, the gap between the inner side of the sleeve 5 and the outer side of the respective spring element 3 is adjusted. The adjusting of the gap is done by an adjustment device 11, which is coupled or connected to the respective spring element 3, for example by latching, as shown in FIG. 1. In the representation of FIG. 2, only one adjustment device is shown for one of the tilting pads and its spring element, indicated highly simplified and purely schematically by a dotted line. In FIG. 4 the respective adjustment device of the associated spring element and tilting pad is not shown for reasons of clarity.

In the embodiment shown in FIG. 1, the adjustment device 11 comprises for example a pin element 12 with a head 13 at its first or inner end, the pin element 12 being provided with an external thread. A corresponding screw may form the pin element 12 with the head 13. The associated tilting pad 4 has a recess 14 on its outer side, as shown in FIG. 1, which can receive the head 13 of the pin element 12. In this way, design space can be saved. However, such a recess 14 in the tilting pad 4 is merely optional. No such recess is shown in the tilting pads in the simplified representations of FIGS. 2 and 4 for reasons of clarity.

Furthermore, the adjustment device 11 comprises for example a nut 15 with a corresponding internal thread, which is screwed onto a second or outer end of the pin element 12. The pin element 12 is received in a through bore 16 of the sleeve 5, while the head 13 of the pin element 12 is arranged in the sleeve 5 and the nut 15 screwed onto the pin element 12 is arranged at the outside of the sleeve 5. The sleeve 5 optionally has an additional recess 17 on the outer side, as shown in FIG. 1, which can receive the nut 15, for example in flush manner. Depending on the function and purpose of use, such a recess 17 on the outer side of the sleeve 5 to receive the nut 15 may also be omitted. No such recess is shown in the sleeve in the simplified representations of FIGS. 2 and 4 for reasons of clarity.

The spring element 3 may be configured such that it has a hole or a bore, the spring element 3 being strung by its hole or its bore onto the pin element 12 of the adjustment device 11 before the adjustment device 11 is then mounted together with the spring element 3 in the sleeve 5. Likewise, however, the spring element 3 may also be snapped or clipped onto the pin element 12, as shown in FIG. 1. For this, the spring element 3 may be configured such as to have a through opening 18, being circular in shape, for example, and having at least one or more flexible detent sections 19, which are distributed along the margin of the through opening 18. The through opening 18 with its flexible detent sections 19 is large enough in dimension to be pushed over the head 13 of the pin element 12, whereupon the flexible detent sections 19 are at first pressed outward, as the head 13 is passed through, and then spring back into place. The detent section opening 20 formed by the outer ends or end edges of the detent sections 19 has a diameter which is e.g. the same size or larger than the outer diameter of the pin element 12 and smaller than the outer diameter of the head 13 of the pin element 12 in FIG. 1 and accordingly also smaller than the diameter of the through opening 18. In this way, the spring element 3 can be pushed over the head 13 of the pin element 12 in FIG. 1, pushing the detent sections 19 to the side. After passing the head 13, the detent sections 19 spring back into place, so that the spring element 3 cannot slip off accidentally from the pin element 12, but instead is retained by its head 13. For a better latching, the spring element 3 may possibly be formed with a lesser thickness in the area of the detent sections 19 than the otherwise thickened center of the spring element 3.

In order to adjust the gap between the inner side of the sleeve 5 and the outer side of the spring element 3 and thus the spring tensioning of the spring element 3, the spring element 3, by means of the adjustment device 11 coupled to the spring element, is moved in the direction of the inner side of the sleeve 5 or away from the inner side of the sleeve 5.

In the exemplary embodiment of the adjustment device 11 shown in FIG. 1, the nut 15 is screwed along the threaded segment of the pin element 12 in the direction of the sleeve 5 and the spacing or gap between the outer side of the spring element 3 and the inner side of the sleeve 5 and the corresponding pre-tensioning of the spring element 3 is adjusted.

Due to the fact that the spring element 3 has at least two sections with stiffness of different magnitude owing to varying the thickness of the spring element in the width direction and/or longitudinal direction, the spring characteristic of the spring element 3 and thus the gap between the outer side of the spring element 3 and the inner side of the sleeve 5 can be specifically adjusted and adapted to a particular purpose of use, e.g., in a machine with very high running speed or on the contrary low running speed. For example, the spring element 3 in FIGS. 1-4 and in the following FIG. 5-8 owing to the greater thickness in a middle area has a greater spring stiffness in this area than in the area of its lengthwise edges, where the thickness of the spring element 3 is less than that in the middle section. In this way, the effect is achieved that, during increasing speed of the shaft 2 mounted by the tilting-pad bearing 1, the respective tilting pad 4 can apply a greater force to the associated spring element 3, without the tilting pad 4 and with it the shaft 2 moving in an undesirable manner too far to the outside toward the inner side of the sleeve 5, which might otherwise lead to a rubbing of a wheel connected to the shaft 2 against an associated housing. Owing to the thickened section or region, the spring element 3 is stiffer in this thickened section or region and can absorb a greater force from the tilting pad 4 if need be. The spring element 3 during the running up of the shaft 2 or at high speeds of the shaft 2 in the installed state, as shown in FIGS. 3 and 4, is less strongly bent toward the outside by the pressure of the associated tilting pad 4, so that the shaft 2 mounted by the tilting-pad bearing 1 can accordingly move less radially outward with the tilting pad 4. In this way, an unwanted rubbing of a wheel connected to the shaft 2 against an associated housing can be prevented. The thickness of the spring element 3 and in particular the position, the level of the thickness, the thickness profile and so forth of the at least two cross section regions of different thickness of the spring element can be specifically adapted to the particular application of the tilting-pad bearing 1 and the speed ranges of the shaft 2, as well as the operating conditions of the tilting-pad bearing 1 and the shaft 2 which is mounted by the tilting-pad bearing 1, such as the operating temperature and so forth, or be designed suitably for this application.

FIG. 3 shows, as described above, a highly simplified view of the spring element 3 in the installed condition per FIG. 2.

Since the cross section of the respective spring element 3 is formed thinner in the width direction B in the region of its two end points 6 at the end edges 7 than in the middle, the spring element 3 is soft in the region of its lengthwise end edges 7 and accordingly has less spring stiffness than in the middle. With cross section thickness of the spring element 3 increasing in the width direction B, e.g., as far as the center, indicated by the points P1 and P2 as well as P1* and P2* on the spring element 3 in FIG. 3, the spring stiffness of the spring element 3 accordingly increases, as indicated by the two arrows S and S* in FIG. 3. Arrow F represents the force of the respective tilting pad during the run-up of the shaft which is mounted by the tilting-pad bearing. In this process, the so-called bending beam is shortened.

The following FIGS. 5 to 9 show schematic, highly simplified, not true to scale and transparent perspective views of various exemplary embodiments of the spring element 3, which can be used for the respective tilting pad 4 of the tilting-pad bearing 1 shown for example previously in FIGS. 1, 2 and 4. The respective opening, e.g., the through bore 16 or the through opening 18 with detent sections 19, of the spring element 3 for connecting to the above described adjustment device 11 for adjusting the pre-tension of the spring element is not shown in FIG. 5 to 9 for reasons of clarity.

As is shown in FIG. 5, the cross section of the spring element 3 may increase in thickness in the width direction B on at least one side of its two end points 6 at the lengthwise end edges 7, for example increasing continuously toward the center of the spring element 3, as indicated by a solid line for one side of the spring element 3, e.g., the outer side or the side of the spring element opposite the sleeve, and by a dashed line for the other side of the spring element 3, e.g., the inner side or the side of the spring element opposite the shaft. Both sides of the spring element may increase in thickness from the end edges toward the center, so that both sides are outwardly curved or convex, as indicated in FIG. 5, or one side may be flat or planar in design, as shown in FIG. 6. The cross section of the spring element in the longitudinal direction, on the other hand, may have a constant thickness, as shown in FIGS. 5 and 6. The spring element may for example be symmetrical in configuration and the two end points 6 may form an axis of symmetry, e.g., and/or the center axis 9 of the cross section of the spring element. The same holds for the center axis 9 in the following FIG. 6, which may likewise form an axis of symmetry of the spring element 3.

In FIG. 6, the spring element 3 as previously described has a curved side and a flat or planar side. The thickness of the cross section of the spring element increases in the width direction B toward the center or center axis 9 and then decreases once more. The increase and/or decrease of the thickness of the spring element in the width direction may be continuous or discontinuous for at least a portion. The thickness of the cross section in the longitudinal direction L, instead, is constant in the exemplary embodiment of FIG. 6.

Figure 7:
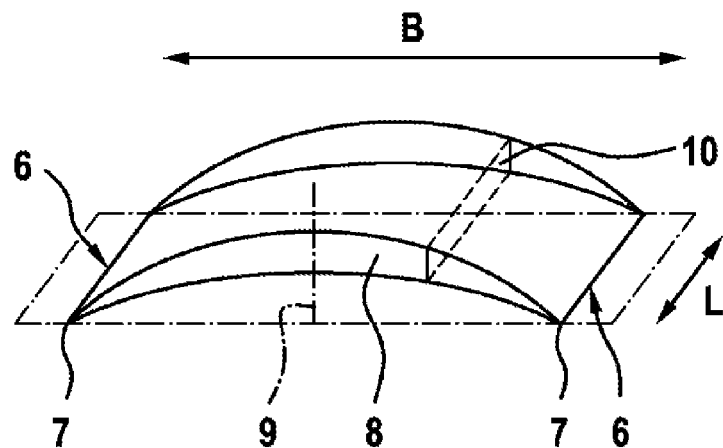
FIG. 7, a schematic and highly simplified sectional view of yet another embodiment of a spring element of the tilting-pad bearing according to the invention.

In the exemplary embodiment of the spring element in FIG. 7, the spring element 3 is outwardly curved or convex on one side and inwardly curved or concave on the other side. The thickness of the cross section of the spring element 3 likewise increases in the width direction B as far as the center and then decreases. On the other hand, the thickness of the cross section of the spring element 3 is constant in the longitudinal direction L, for example.

Figure 8:
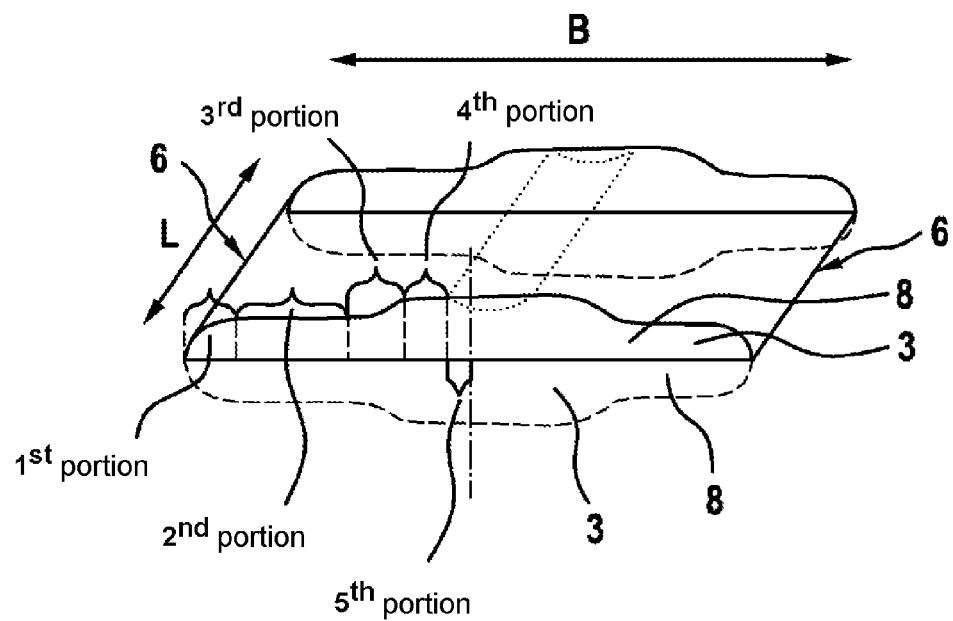
FIG. 8, a schematic and highly simplified sectional view of a different embodiment of a spring element of the tilting-pad bearing according to the invention.

In the exemplary embodiment of the spring element 3 shown in FIG. 8, the thickness of the cross section of the spring element 3 increases discontinuously in the width direction B from an end point 6 of the cross section on the lengthwise end edge 7 of the spring element up to the center axis 9 and then decreases discontinuously once more up to the opposite end point 6. In the exemplary embodiment of FIG. 8, the spring element 3 accordingly has a cross section segment in the width direction B in which the thickness increases continuously. In the following second segment, the thickness is constant. In the following third segment, the thickness once again increases continuously up to the following fourth segment, in which the thickness remains constant up to the center axis 9 and axis of symmetry of the spring element 3 in the exemplary embodiment of FIG. 8. As indicated by the broken line in FIG. 8, the axis through the two end points may also form an axis of symmetry of the spring element.

In a further exemplary embodiment, indicated in FIG. 8 by a dotted line, the fourth segment need not run entirely up to the center axis of the cross section of the spring element 3, but instead adjoin on a fifth segment in which the thickness of the cross section of the spring element 3 decreases up to the center axis 9, for example decreases continuously. The thickness of the cross section of the spring element 3 in the longitudinal direction L is, on the contrary, constant for example.

The respective spring element, as was shown previously in FIG. 1-8 for example, can be varied in its thickness and thus in its stiffness so that the spring element has a progressive or degressive spring characteristic, depending on the function and the purpose of use. This applies for all embodiments of the invention.

Although the present invention has been completely described in the foregoing with the aid of preferred exemplary embodiments, it is not limited to these, but instead can be modified in many ways. The exemplary embodiments shown in FIG. 1 to 8 may be combined with each other, in particular individual features thereof may be combined.

What is claimed is:
1. A tilting-pad bearing (1), comprising:
a sleeve (5), and
a plurality of tilting pads (4), which are arranged in the sleeve (5),
wherein an associated spring element (3) is provided between the sleeve (5) and a respective tilting pad (4), wherein the spring element (3) has at least two sections with a stiffness of different magnitude as a result of varying a thickness of a cross section (8, 10) of the spring element (3) in at least one of a width direction and a longitudinal direction of the spring element (3), and wherein each tilting pad (4) includes a surface structuring at least in one portion of an outer side, wherein the surface structuring is a micro-structuring or a ground surface.

2. The tilting-pad bearing as claimed in claim 1, characterized in that the thickness of the cross section (8, 10) of the spring element (3) increases in at least one of the width direction and the longitudinal direction of the spring element (3) starting from one end point (6) of the cross section, and then decreases once more toward an opposite end point (6) of the cross section.

3. The tilting-pad bearing as claimed in claim 1, characterized in that the thickness of the cross section (8, 10) of the spring element (3) is constant in the width direction or longitudinal direction of the spring element (3) from one end point (6) of the cross section (8, 10) to an opposite end point (6) of the cross section.

4. The tilting-pad bearing as claimed in claim 1, characterized in that the thickness of the cross section (8, 10) increases continuously or increases discontinuously in at least one portion of the cross section of the spring element (3) in at least one of the width direction and the longitudinal direction, or the thickness of the cross section (8, 10) decreases continuously or decreases discontinuously in at least one portion of the cross section in the width direction or longitudinal direction.

5. The tilting-pad bearing as claimed in claim 1, characterized in that the stiffness of the spring element (3) increases continuously or discontinuously or decreases continuously or discontinuously starting from end edges (7) of the spring element toward a center (9) of the spring element.

6. The tilting-pad bearing as claimed in claim 1, characterized in that the cross section (8, 10) of the spring element (3) is symmetrical in at least one of the width direction and the longitudinal direction.

7. The tilting-pad bearing as claimed in claim 1, characterized in that, an outer side of the spring element (3) is positioned opposite to the sleeve (5) and an inner side of the spring element (3) that is positioned opposite to one of the plurality of tilting pads (4), wherein at least one of the outer side and the inner side of the spring element (3) is outwardly curved or concave.

8. The tilting-pad bearing as claimed in claim 7, characterized in that the outer side or inner side of the spring element (3) is planar.

9. The tilting-pad bearing as claimed in claim 7, characterized in that at least one of the outer side of the spring element (3) and the inner side of the spring element (3) is inwardly curved or convex.

10. The tilting-pad bearing as claimed in claim 1, characterized in that the spring element (3) has a progressive or degressive spring characteristic.

11. The tilting-pad bearing as claimed in claim 1, characterized in that a gap between an inner side of the sleeve (5) and an outer side of the respective spring element (3) can be adjusted by an associated adjustment device (11), which is coupled to the spring element (3).

12. The tilting-pad bearing as claimed in claim 1, characterized in that at least one of the tilting pads (4) of the tilting-pad bearing (1) is formed from at least one of graphite and steel.

13. The tilting-pad bearing as claimed in claim 1, characterized in that each of the tilting pads (4) is provided with at least one of a coating and an additional surface structuring at least in one portion of the outer side.

14. The tilting-pad bearing as claimed in claim 1, characterized in that each associated spring element is made of at least one of metal, plastic and a fiber composite.

15. The tilting-pad bearing as claimed in claim 1, characterized in that each associated spring element is made of metal and is fully milled from the metal.

16. The tilting-pad bearing as claimed in claim 1, characterized in that the thickness of the cross section (8, 10) of the spring element (3) increases in at least one of the width direction and the longitudinal direction of the spring element (3) starting from one end point (6) of the cross section toward the center (9) of the cross section (8, 10), and then decreases once more toward an opposite end point (6) of the cross section from the center (9) of the cross section (8, 10).

17. The tilting-pad bearing as claimed in claim 1, characterized in that the cross section (8, 10) of the spring element (3) is symmetrical in at least one of the width direction and the longitudinal direction and has at least one axis of symmetry (9).

18. The tilting-pad bearing as claimed in claim 1, characterized in that the cross section (8, 10) of the spring element is not symmetrical in at least one of the width direction and the longitudinal direction.

19. The tilting-pad bearing as claimed in claim 1, characterized in that each of the tilting pads (4) is provided with a coating at least in one portion of the outer side, wherein the coating is at least one of a C layer, a brass coating, or a lubricating varnish.

20. The tilting-pad bearing as claimed in claim 1, characterized in that the surface structuring is a micro-structuring.

21. The tilting-pad bearing as claimed in claim 1, characterized in that the surface structuring is a ground surface.

22. The tilting-pad bearing as claimed in claim 1, wherein the surface structuring is both a micro-structuring and a ground surface.

* * * * *